US012614963B2

(12) United States Patent (10) Patent No.: US 12,614,963 B2
Robinson et al. (45) Date of Patent: Apr. 28, 2026

(54) NON-AXISYMMETRIC MOTOR WITH INTEGRATED MAGNETIC GEARING

(71) Applicant: Regal Beloit America, Inc., Beloit, WI (US)

(72) Inventors: Ben Robinson, Donvale (AU); Mark K. Thiele, Cape Woolamai (AU); Dean James Patterson, Murwillumbah (AU); Greg Heins, Melbourne (AU)

(73) Assignee: Regal Beloit America, Inc., Milwaukee, WI (US)

( * ) Notice: Subject to any disclaimer, the term of this patent is extended or adjusted under 35 U.S.C. 154(b) by 291 days.

(21) Appl. No.: 18/336,701

(22) Filed: Jun. 16, 2023

(65) Prior Publication Data

US 2024/0421685 A1 Dec. 19, 2024

(51) Int. Cl.
 *H02K 49/10* (2006.01)
(52) U.S. Cl.
 CPC ................................. *H02K 49/102* (2013.01)
(58) Field of Classification Search
 CPC ...... H02K 49/00; H02K 49/10; H02K 49/102; H02K 1/14; H02K 1/141; H02K 1/143; H02K 1/148; H02K 21/00; H02K 21/18; H02K 21/185; H02K 21/20; H02K 37/00; H02K 37/14; H02K 37/16; H02K 37/18; G04C 3/00; G04C 3/14; G04C 13/00; G04C 13/10; G04C 13/11
 See application file for complete search history.

(56) References Cited

U.S. PATENT DOCUMENTS

| | | | | | |
|---|---|---|---|---|---|
| 4,162,418 | A | * | 7/1979 | Kawaki | G04C 13/11 |
| | | | | | 310/49.23 |
| 4,855,629 | A | * | 8/1989 | Sato | H02K 21/14 |
| | | | | | 310/68 B |
| 6,809,452 | B2 | * | 10/2004 | Cho | H02K 11/33 |
| | | | | | 310/216.001 |
| 7,064,468 | B2 | | 6/2006 | Fujinaka | |
| 2006/0145559 | A1 | * | 7/2006 | Kopac | H02K 29/12 |
| | | | | | 310/68 B |
| 2010/0225197 | A1 | * | 9/2010 | Fulford | H02K 1/185 |
| | | | | | 310/216.111 |
| 2017/0063176 | A1 | * | 3/2017 | Li | H02K 21/185 |

OTHER PUBLICATIONS

I. Boldea, L. Tutelea, M. Topor, "Theoretical Characterization of Three Phase Flux Reversal Machine with Rotor-PM Flux Concentration", 2012, 6 pages.

* cited by examiner

*Primary Examiner* — Tran N Nguyen
(74) *Attorney, Agent, or Firm* — Armstrong Teasdale LLP

(57) ABSTRACT

A motor assembly having a stator assembly and a rotor assembly for an electric motor assembly is disclosed. The stator assembly includes at least two stator arms. Each stator arm including: a distal portion having an inner surface and a plurality of stator teeth spaced along the inner surface of each of the at least two stator arms, the distal portions collectively defining a stator opening, the opening having a longitudinal axis, and, a conductor portion located proximate to the distal portion, the conductor portion non-axisymmetric relative to the longitudinal axis of the opening; and. The rotor assembly is located in the opening proximate the stator teeth.

19 Claims, 14 Drawing Sheets

300

350

340

330

310

360

364

362

312

330

350

NON-AXISYMMETRIC MOTOR WITH INTEGRATED MAGNETIC GEARING

BACKGROUND

The field of the disclosure relates generally to electric motors and generators, and more particularly, to non-axisymmetric motors with integrated magnetic gearing. Radial flux electric machines such as motors or generators generally include spoked permanent magnets positioned within a rotor core. The rotor core is formed from multiple laminations. The laminations define circumferentially spaced poles within the rotor core. Alternatively, the poles may comprise discrete members supported by the rotor. In the alternate rotor, slots are formed between adjacent poles, and spoke magnets are disposed in the slots. To further increase the efficiency of the motor, and prevent flux from leaking across laminations, the rotor can include axial magnets positioned adjacent the ends of the spoked rotor magnets.

In radial flux electric machines, such as electric motors and generators, a stator is positioned proximate the rotor. During use, the stator is stationary while the rotor rotates relative to the stator. The stator may be located at the rotor outer periphery. The stator comprises a combination of a laminated core and coils of insulated wire referred to as windings. When alternating current is applied to stator windings, a magnetic field is created that produces the desired rotor rotation, thereby producing the associated motor power.

To increase the motor power rating in known electric motors, the size of the coil windings may be increased. The size/extent of the coils may be increased by expanding the diameter of the coil wires or the number of windings may be increased. The larger coil size and geometry generates greater electrical loadings which produce greater motor power. In such a motor, the coil size/increased windings may be increased without modifying the geometry/configuration of motor assembly or motor components. Known motor designs allow for the use of larger diameter coils without having to proportionately increasing the size of the rotor assembly.

Such electrical motors are typically symmetric relative to the stator opening or rotor shaft or axis of rotation. E.g., with windings diametrically opposed on opposite stator sides. Although the power of an electric motor with symmetric configuration can be increased by adjusting the coil characteristics, the power increase is limited by at least the volume available to house the increased coil windings and the symmetric configuration. Typically, in use, it is preferred that the motor footprint remain constant to ensure the assembly fits in the system when the motor will be installed. The tendency to implement symmetric motors may serve as a design factor that limits the power that may be produced by an electric motor. The need to maintain motor housing dimensions constant limits available internal volume for housing the conductors and thereby limits the size and extent of conductors that may be accommodated in a specific motor housing may also serve to limit the electric motor power output.

Thus, there is a need in the field for improved stator assembly that enables motors to supply increased power.

BRIEF DESCRIPTION

In one aspect, a motor assembly for an electric motor assembly is disclosed. The motor assembly includes a stator assembly and a rotor assembly. The stator assembly includes at least two stator arms, each stator arm including: a distal portion having an inner surface and a plurality of stator teeth spaced along the inner surface of each of the at least two stator arms, the distal portions collectively defining a stator opening, the opening having a longitudinal axis, and, a conductor portion located proximate to the distal portion, the conductor portion non-axisymmetric relative to the longitudinal axis of the opening. The rotor assembly is located in the opening proximate the stator teeth. In some embodiments, the stator assembly further include a conduction coil enveloping the conductor portion of each of the at least two stator arms. In some embodiments, the conduction coil of each of the at least two stator arms are arranged non-axisymmetrically around the rotor assembly.

In another aspect, a stator assembly is disclosed. The stator assembly includes at least two stator arms. Each stator arm includes a distal portion having an inner surface and a plurality of stator teeth spaced along the inner surface of each of the at least two stator arms, the distal portions collectively defining a stator opening, the opening having a longitudinal axis, and, a conductor portion located proximate to the distal portion, the conductor portion arranged non-axisymmetrically around the longitudinal axis of the opening.

DETAILED DESCRIPTION

Figure 1:
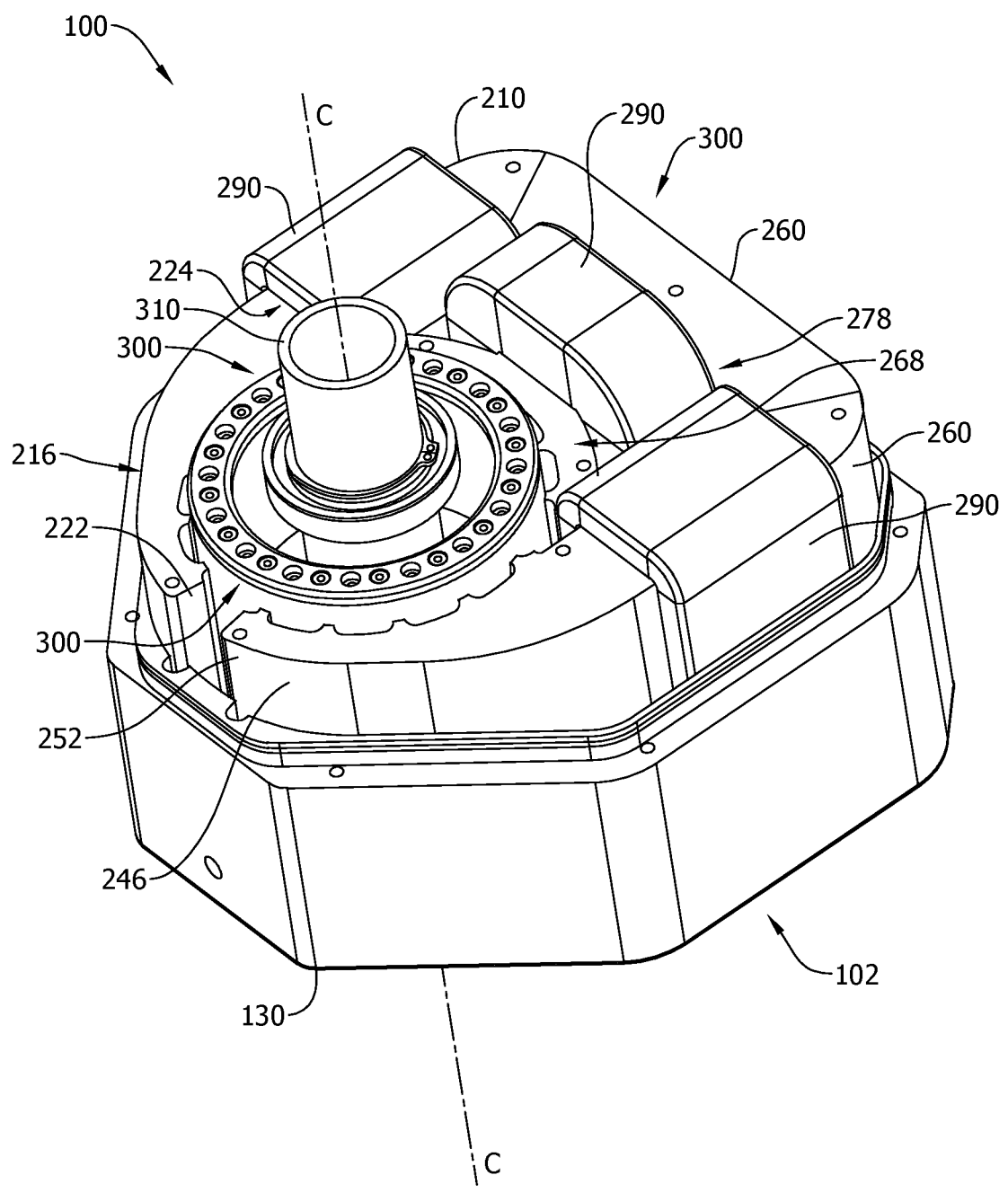
FIG. 1 illustrates a perspective view of an exemplary non-axisymmetric electric motor.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

A motor assembly is disclosed. The motor assembly generally includes a stator, a rotor, and a number of conductors supported along the stator arms. The stator includes at least two stator arms, and each stator arm includes an inner surface and a plurality of stator teeth spaced along the inner surface of each of the at least two stator arms. The stator arms collectively define a stator opening having a longitudinal axis. The number of conductors are located along the stator arms and are oriented non-axisymmetrically relative to the longitudinal axis of the stator opening. The rotor assembly is located in the opening proximate the stator teeth. In some embodiments, the stator assembly further includes a conduction coil enveloping the conductor portion of each of the at least two stator arms.

In some embodiments, the conduction coil associated with each of the at least two stator arms are arranged non-axisymmetrically around the rotor assembly. As used herein, the term "axisymmetrical" denotes an element or component symmetrical about an axis. As used herein, the terms "non-axisymmetrically" and "non-axisymmetrical" with reference to the conduction coils and stator arms (and more generally the stator and motor assembly) refer to a stator having conduction coils and stator arms which are not symmetrical about a central longitudinal axis of the stator opening. Stated differently, the stator arms and/or the coils are positioned and oriented independently from the central longitudinal axis of the stator opening. A non-axisymmetrical stator (and in particular the conduction coils) therefore have a decoupled electromechanical relationship from the rotor (and windings or coils of the rotor). As will be described in more detail below, the stator has at least one conduction coil or at least one arm non-axisymmetrical about the central longitudinal axis of the stator opening.

Orienting the conduction coils 290 and the medial conductor portions (224, 254, 278) of the arms (210, 240, 260) in a non-axisymmetric configuration allows for maximizing the envelop and space of the motor housing assembly 102 such that larger conduction coils 290 may be used which generate greater electric loadings without affecting the geometry of the rotor assembly 300. Unlike conventional symmetrical motors, which require proportionally sized axisymmetric rotors and stators, the non-axisymmetric configuration of the electric motor 100 allows for larger conduction coils 290 without having to proportionally increase the size of the rotor assembly 300.

As used herein, the term "electric motor" denotes an electrical machine which converts electrical energy into mechanical energy. The electric motor operates through the interaction between the magnetic fields formed in wire windings of a stator and integrated magnets of the rotor to generate force in the form of torque applied on a rotor shaft. An electric generator converts mechanical energy to electrical energy The components generally comprising a stator, rotor, conductors and housing may be provided in both the generator and motor. Therefore, because the electric generator and motor are similar in their operability and mechanical aspects, it should be understood that the mechanical aspects of the electric motors described herein also describe an electrical generator, and the term electric motor also includes electric generators.

FIG. 1 is a perspective view of an electric motor 100. Although referred to herein as electric motor 100, electric motor 100 can be operated as either a generator or a motor. The electric motor 100 includes a motor housing assembly 102, a stator assembly 200 and a rotor assembly 300. FIG.

Figure 2:
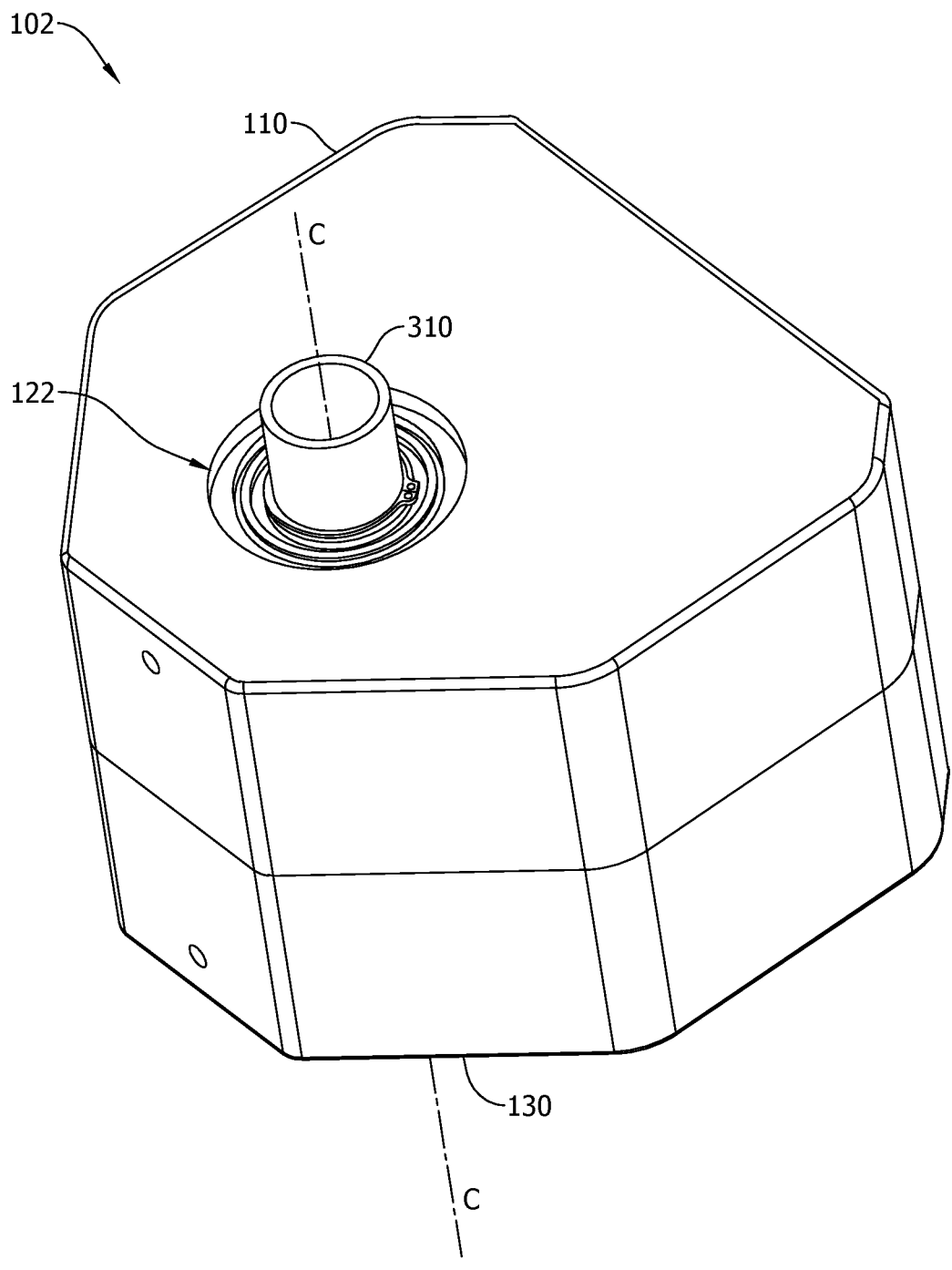
FIG. 2 illustrates an exemplary motor housing of the electric motor of FIG. 1.
Figure 3:
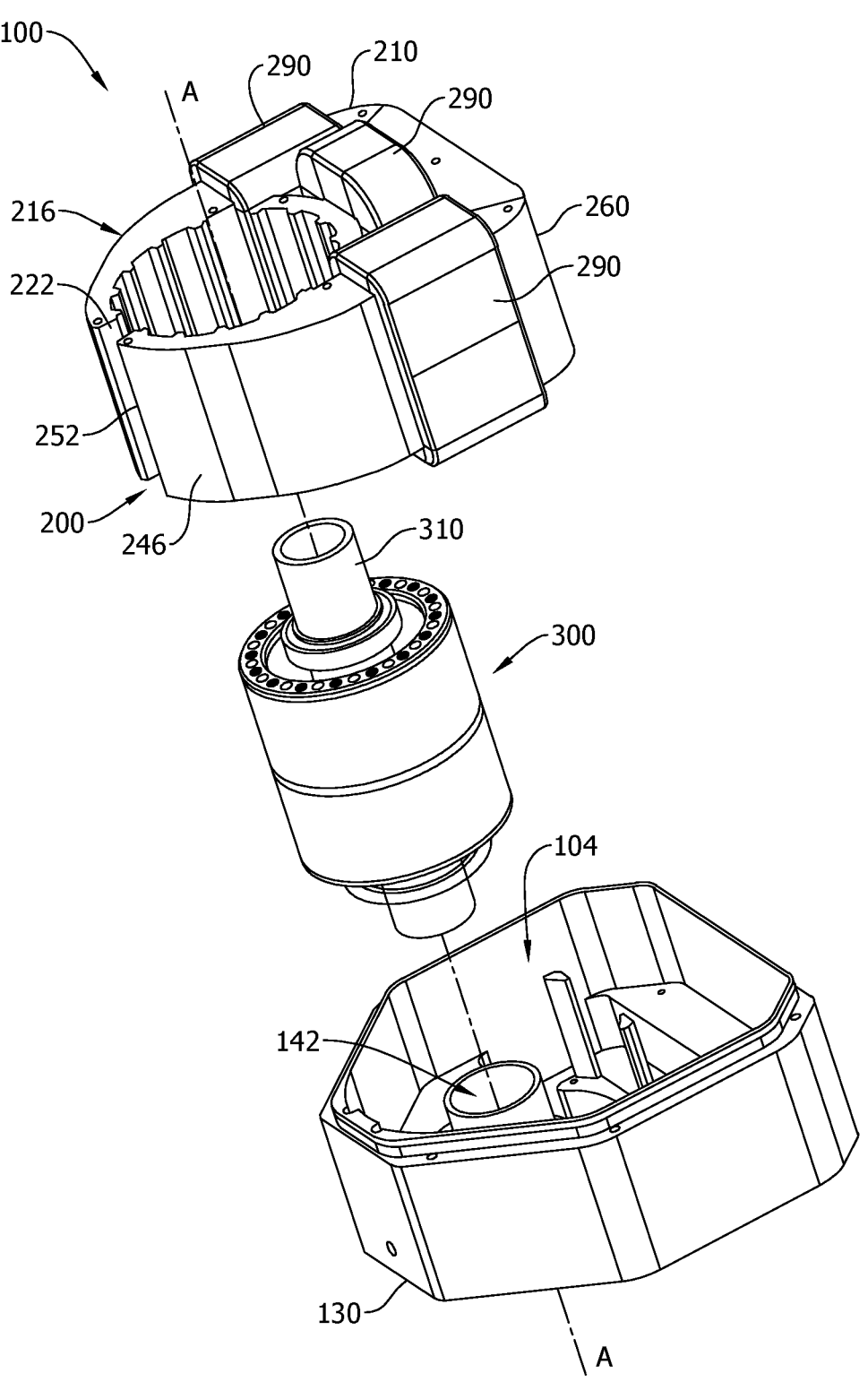
FIG. 3 illustrates an exploded view of the electric motor of FIG. 1.
Figure 9:
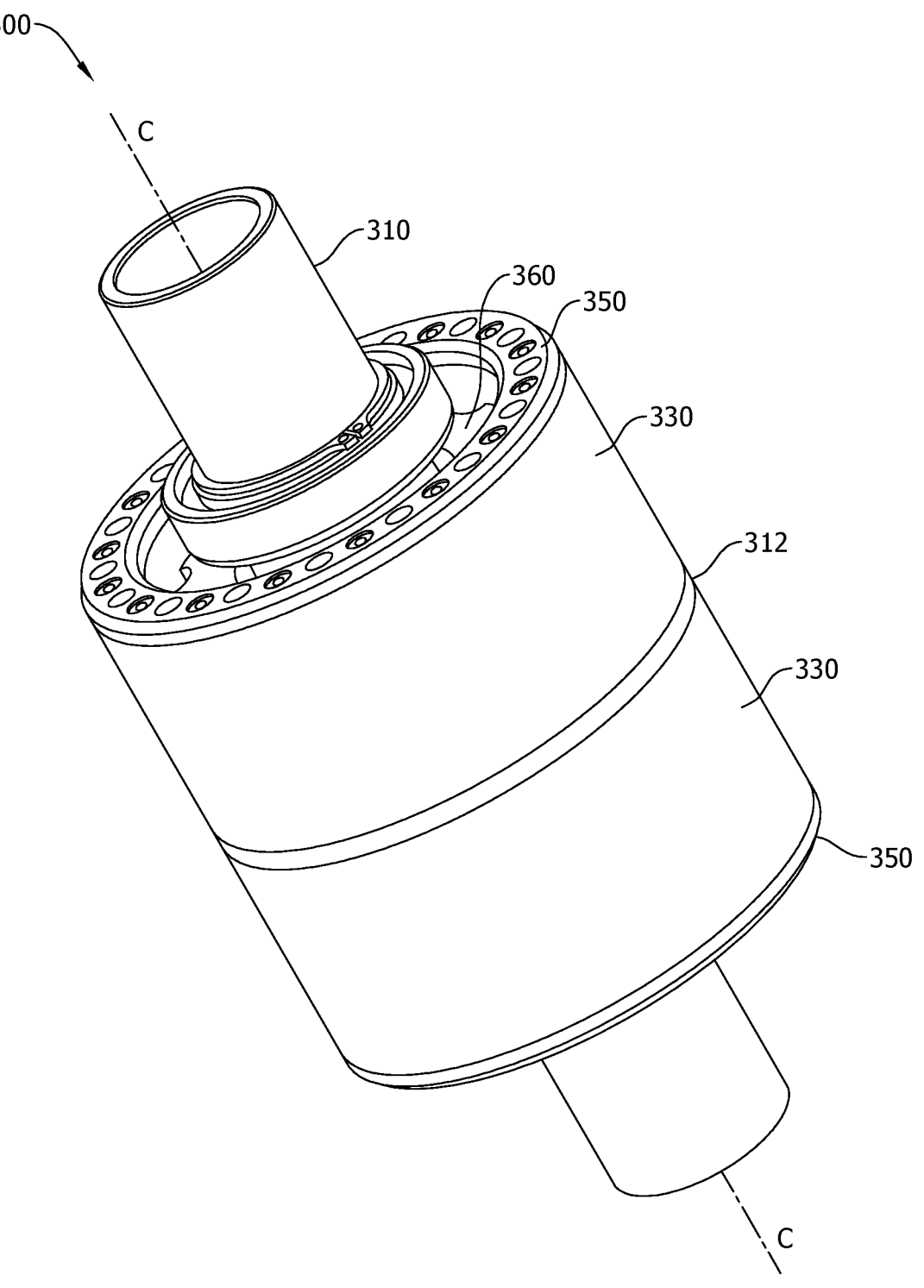
FIG. 9 illustrates a perspective view of the rotor assembly of FIG. 3.

2 illustrates a motor housing assembly 102 and FIG. 3 illustrates an exploded view of the electric motor 100. The exploded view of FIG. 3 does not show top portion 110 of the housing 102. As shown in FIG. 9, rotatable shaft 310 of the rotor assembly 300 has an axis of rotation C which also defines an axis of rotation of the electric motor 100. The motor housing assembly 102 includes a bottom enclosure 130 and a top enclosure 110. When the two portions of the housing are combined and assembled, the top and bottom enclosures, in combination define an interior 104 (as best shown in FIG. 3) of the electric motor 100. As best shown in FIG. 2, the motor housing assembly 102 is configured to enable the housing to fully enclose and store the stator assembly 200 and the rotor assembly 300 in the interior 104. Shaft openings (122, 142) in the top enclosure 110 and the bottom enclosure 130 respectively allow the free ends of rotatable shaft 310 to protrude from the motor housing assembly 102. In some embodiments, the rotatable shaft 310 may be coupled to a mechanical load.

Figure 4:
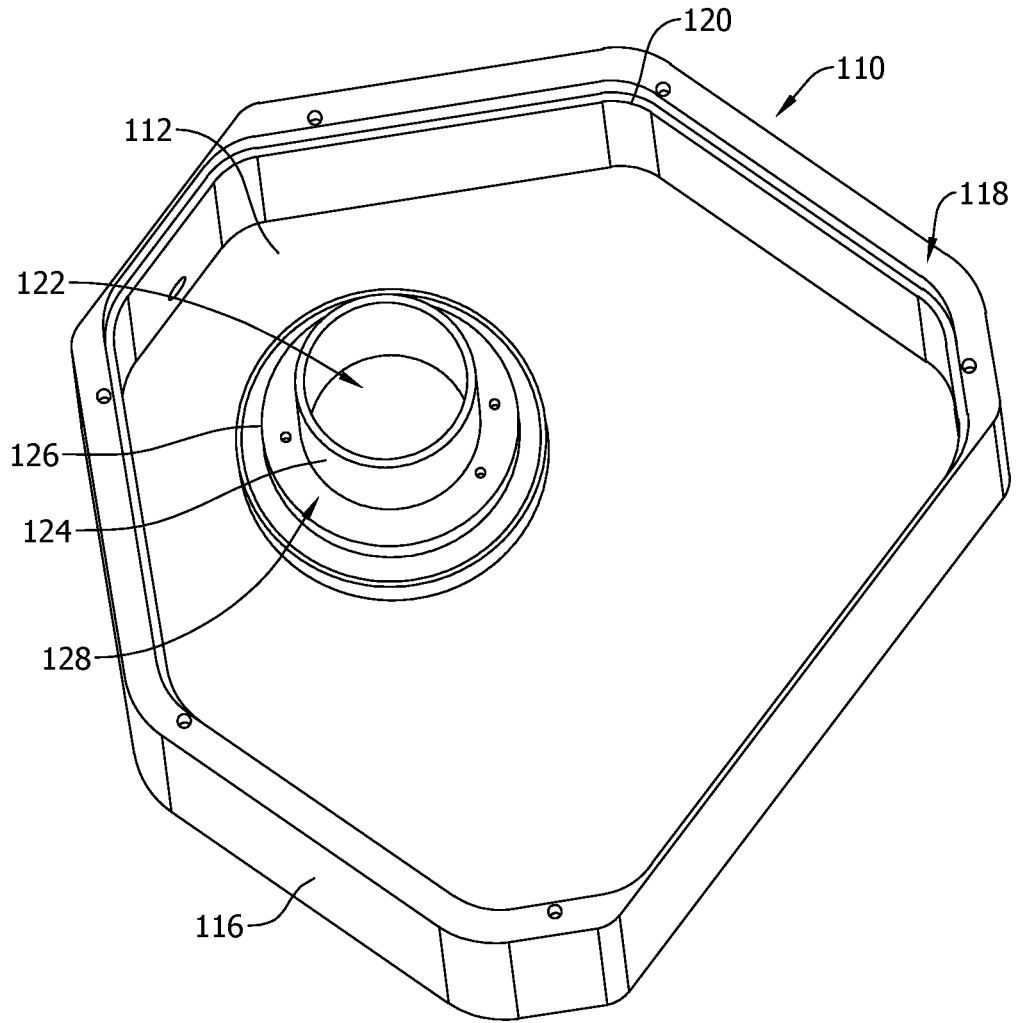
FIG. 4 illustrates a perspective view of a top portion of the motor housing of FIG. 2.
Figure 5:
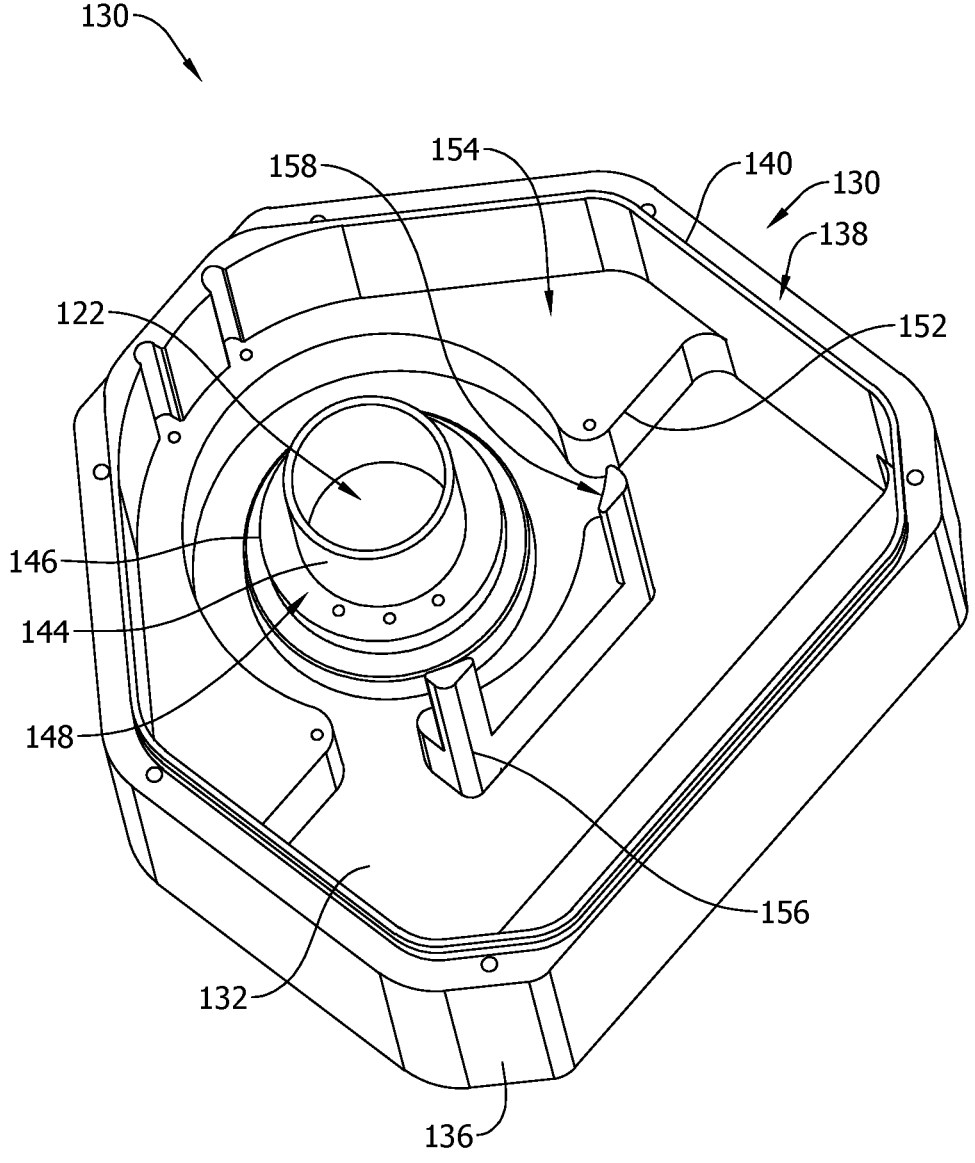
FIG. 5 illustrates a perspective view of a bottom portion of the motor housing of FIG. 2.

FIG. 4 illustrates a perspective view of the top enclosure 110 and FIG. 5 illustrates a perspective view of the bottom enclosure 130. As shown in FIG. 4, the top enclosure 110 includes a ceiling 112 and sidewalls 116 extending from the ceiling 112 at outer peripheral edges of the ceiling 112. The sidewalls 116 have a planar mating surface 118 opposite, and parallel to the ceiling 112. In some embodiments, the planar mating surface 118 includes an inner ledge 120 for mating with a lip 140 of the bottom enclosure 130 (as shown in FIG. 5). A gasket (not shown), or more generally, a flexible gasketing material, may be positioned on the planar mating surface 118 such that a fluid-resistant or a particle-resistant seal is formed between the top enclosure 110 and bottom enclosure 130 when the two enclosure halves are mated. The ceiling 112 further includes a shaft opening 122 extending through the ceiling 112 for receiving a shaft 310 of the rotor assembly 300 (as shown in FIGS. 2, 3 and 9). In some embodiments, a cylindrical wall or hub 124 is disposed on the ceiling 112 at the opening 12. The hub 124 serves to surround and support the shaft end 310 when is extends through the opening 122. In some embodiments, a cylindrical flange 126 disposed on the ceiling 112 surrounds the hub 124. The cylindrical flange 126 has an outer diameter greater than an outer diameter of the cylindrical wall 124. The cylindrical flange 126 includes a mating surface 128 which abuts against the rotor assembly 300 when the rotor assembly is located in the interior 104.

As shown in FIG. 5, the bottom enclosure 130 includes a floor 132 and sidewalls 136 extending from the floor 132 along the outer periphery of the floor 132. The sidewalls 136 have a flat mating surface 138 opposite and parallel the floor 132. In some embodiments, the flat mating surface 138 includes the lip 140 for mating with the inner ledge 120 of the top enclosure 110 (as shown in FIG. 4). The floor 132 further includes a shaft opening 142 extending through the floor 132 for receiving a free rotatable shaft 310 of the rotor assembly 300 (as shown in FIGS. 2, 3 and 9). In some embodiments, a cylindrical wall or hub 144 disposed on the floor 132 surrounds the shaft opening 142. In some embodiments, a cylindrical flange 146 disposed on the floor 132 surrounds the hub 144. The cylindrical flange 146 has an outer diameter greater than an outer diameter of the hub 144. The cylindrical flange 146 includes a mating surface 154 which abuts against the rotor assembly 300 when the rotor is located in the interior 104. In some embodiments, the bottom enclosure 130 further includes a U-shaped support structure 156 having a pair of arms extending away from the floor 132 and terminating in inside surface 158 for supporting the assembled rotor assembly 300.

Figure 6:
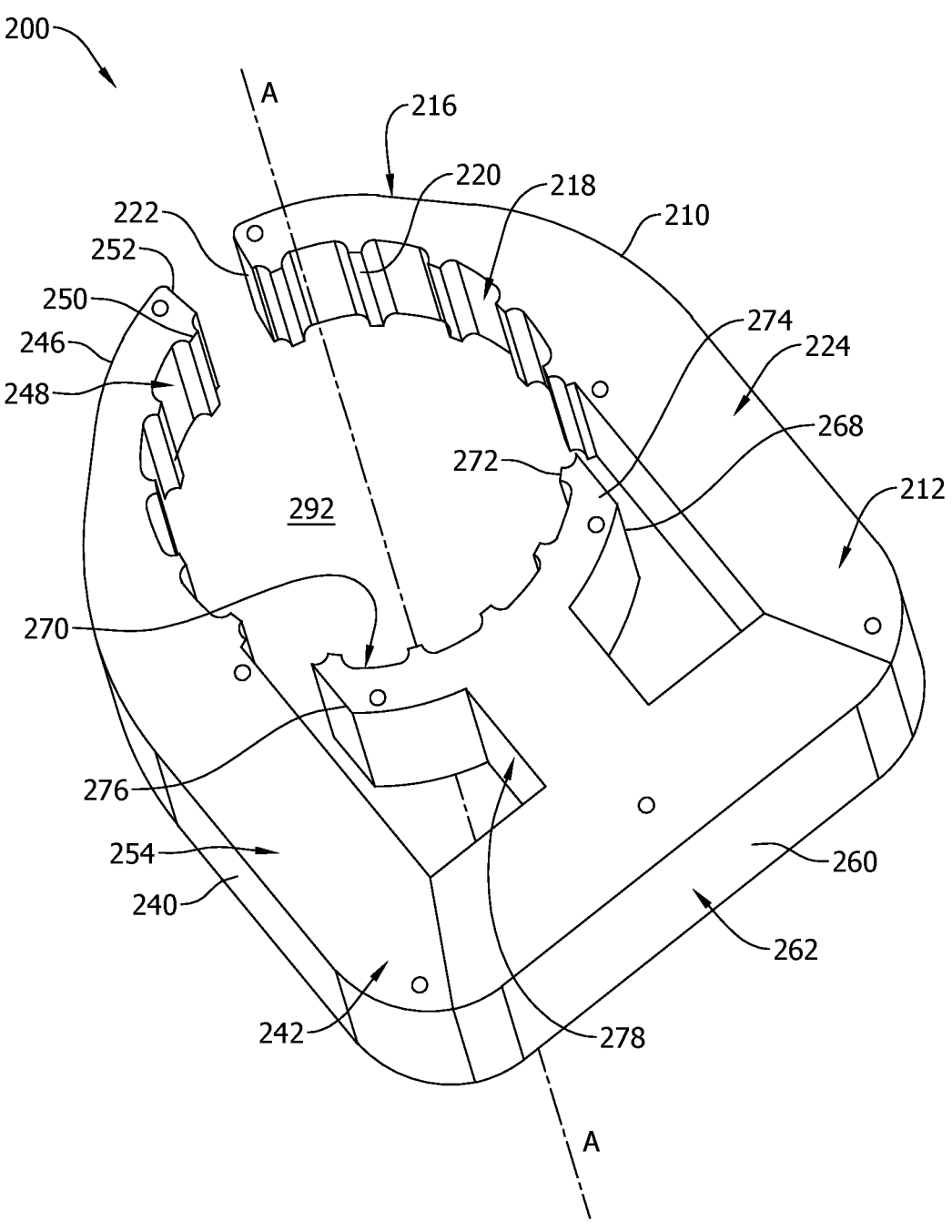
FIG. 6 illustrates a perspective view of the stator assembly of FIG. 3.
Figure 7:
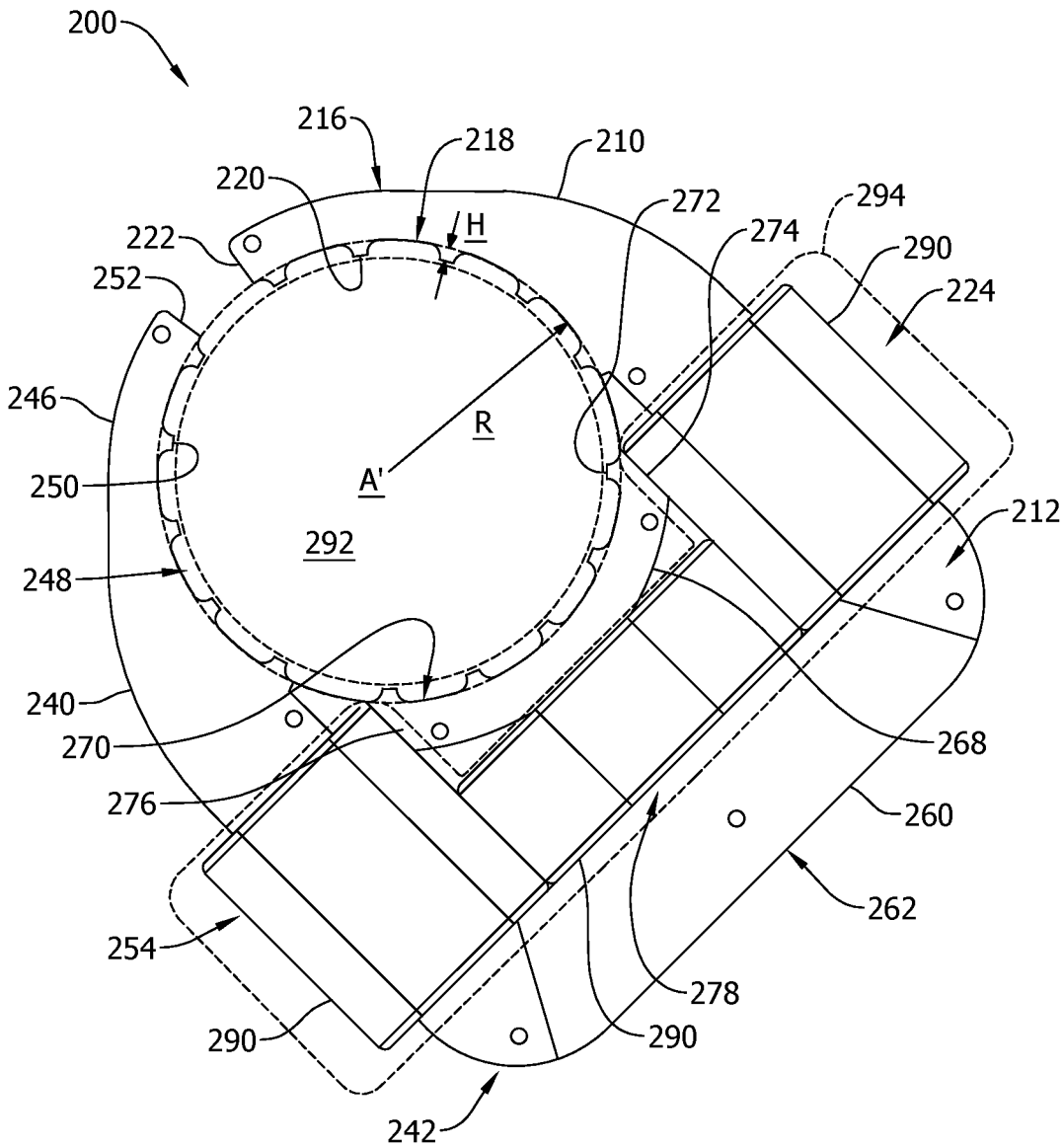
FIG. 7 illustrates a top view of the stator assembly of FIG. 6.
Figure 8:
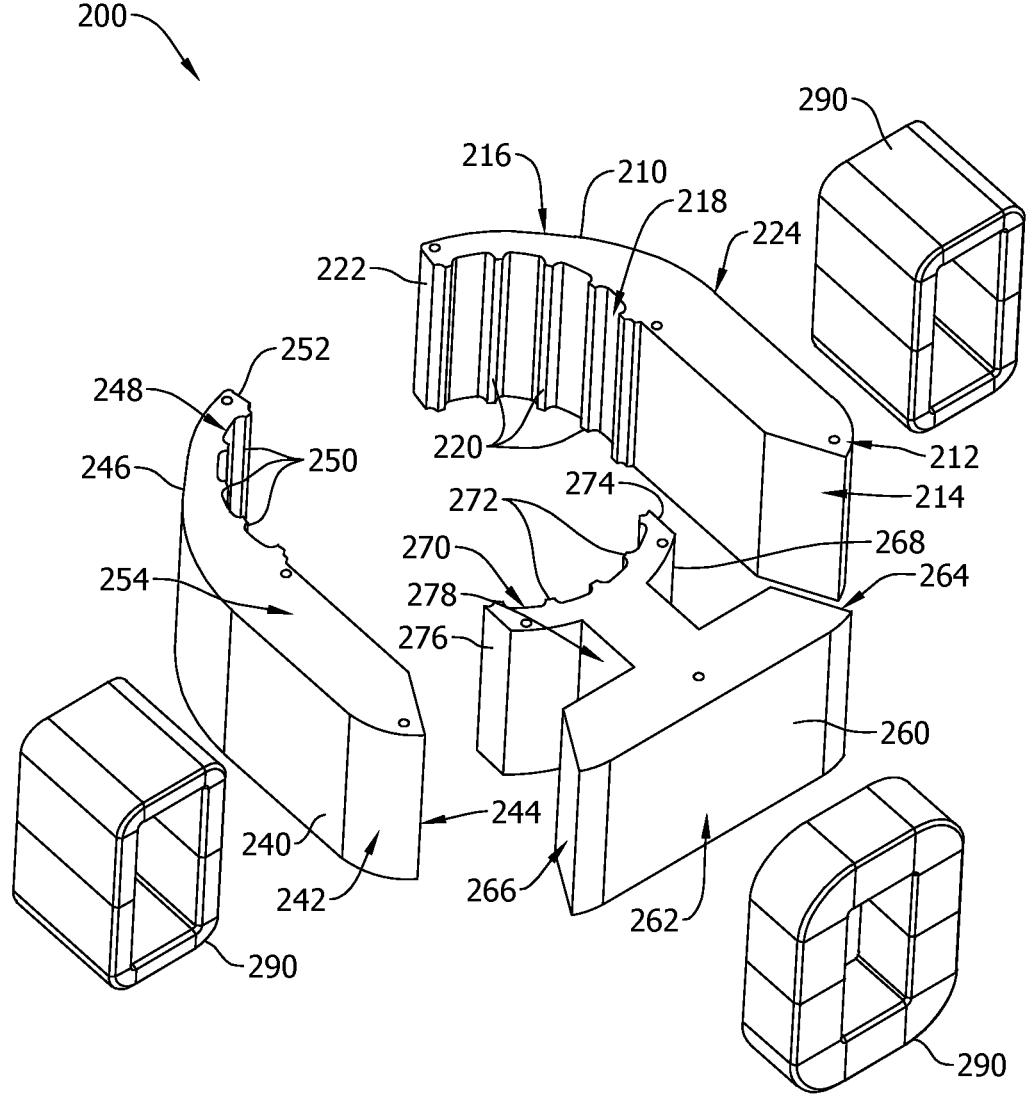
FIG. 8 illustrates an exploded view of the stator assembly of FIG. 3.

FIG. 6 illustrates a perspective view of the stator assembly 200, FIG. 7 illustrates a top view of the stator assembly 200 and FIG. 8 illustrates an exploded view of the stator assembly 200. As illustrated in FIGS. 6 through 8, the stator assembly 200 includes a first arm 210, a second arm 240 and a third arm 260 located between the arms 210 and 240. As described in detail below, in some embodiments, the arms (210, 240, 260) are coupled to or otherwise in contact with or connected one another to form the stator assembly 200 In some embodiments, the arms (210, 240, 260) define a unitary body which forms the stator assembly 200.

Each of the arms (210, 240, 260) supports a respective conductor coil 290, that correspond to an electrical phase of the voltage supplied by the three-phase stator assembly 200. In the illustrated embodiments, the third arm 260 is located between the first arm 210 and second arm 240. In some embodiments, the stator assembly 200 includes two arms to define a single-phase stator assembly or a two-phase stator assembly. As explained in further detail below, portions of the arms (210, 240, 260) that include teeth 220 collectively define a stator opening 292. See FIG. 6. The opening 292 has an associated longitudinal axis A. The rotor assembly 300 is located in the opening 292 when the rotor assembly and stator assembly are combined.

In some embodiments, at least one of the medial conductor portions (224, 254, 278) of the arms (210, 240, 260) are non-axisymmetric relative to the longitudinal axis A of the stator opening 292. By way of example, the third arm 260 is axisymmetrical with respect to the longitudinal axis A which each of the first arm 210 and second arm 260 are individually non-axisymmetric relative to the longitudinal axis A of the stator opening 292. It is understood that a non-axisymmetric electrical motor includes at least one non-axisymmetric phase, arm or conduction coil. Therefore, as used herein, the term "non-axisymmetric motor" defines a stator assembly having at least one phase, arm or conduction coil non-axisymmetric relative to a stator opening, or more generally relative to the axis of rotation of the motor shaft.

The first arm 210 includes a mating portion 212, a distal portion 216 opposite the mating portion 212 and a conductor portion 224 disposed between the mating portion 212 and the distal portion 216. The mating portion 212 includes a mating surface 214 for mating with an adjacent arm, such as the second arm 240 or the third arm 260. In the illustrated embodiment, the mating surface 214 of the first arm 210 abuts a first mating surface 264 of the third arm 260. The distal portion 216 includes a distal end 222 and an inner surface 218 having a plurality of stator teeth 220.

The second arm 240 includes a mating portion 242, a distal portion 246 opposite the mating portion 242 and a conductor portion 254 disposed between the mating portion 242 and the distal portion 246. The mating portion 242 includes a mating surface 244 for mating with an adjacent arm, such as the first arm 210 or the third arm 260. In the illustrated embodiment, the mating surface 244 of the second arm 240 abuts a second mating surface 266 of the third arm 260. The distal portion 246 includes a distal end 252 and an inner surface 248 having a plurality of stator teeth 250.

The third arm 260 includes a mating portion 262 having the first mating surface 264 and the second mating surface 266 opposite the first mating surface 264. The third arm 260 further includes a conductor portion 278 extending from the mating portion 262, and a distal portion 268 extending laterally from the conductor portion 278. The third arm 260 forms a generally H-shaped body where the conductor portion 278 connects the mating portion 262 and the distal portion 268. The distal portion 268 includes a first distal end 274 and a second distal end 276 opposite the first distal end 274. An inner surface 270 of the distal portion 268 (between the first distal end 274 and the second distal end 276) includes a plurality of stator teeth 272.

As best shown in FIG. 7, the distal portions (216, 246, 268) are arc-shaped such that the inner surfaces (218, 248, 270) of the arms (210, 240, 260) face inwardly to the longitudinal axis A. Each of the arc-shaped distal portions (216, 246, 268) has a common arc radius R (from the longitudinal axis A), thereby forming the stator opening 292. The inner surfaces (218, 248, 270) of the arms (210, 240, 260) are thus positioned by radius R from the longitudinal axis A.

The plurality of stator teeth (220, 250, 272) of the arms (210, 240, 260) are similarly configured and spaced evenly along the respective inner distal portion. As a result, each portion 210, 240, 260 includes the same number of stator teeth along the distal portion. In particular, the plurality of stator teeth (220, 250, 272) of the arms (210, 240, 260) all have a common profile, and all have the same height H defined from the inner surfaces (218, 248, 270) of the arms (210, 240, 260). Furthermore, the plurality of stator teeth (220, 250, 272) all have the same pitch (teeth per inch or teeth-per-meter), and the plurality of stator teeth (220, 250, 272) are equally concentric with the longitudinal axis A. The arc length separating adjacent stator teeth (220, 250, 272) defines a pole of the stator assembly 200. The poles of the stator assembly 200 being equal to the number of the plurality of stator teeth (220, 250, 272). It is therefore understood that the number of poles of the stator assembly 200 is used interchangeably with the number of the plurality of stator teeth (220, 250, 272). As will be explained in further detail below, the number of the plurality of stator teeth (220, 250, 272) of the stator assembly 200 and a number of teeth of the rotor assembly 300 define a magnetic gear ratio of the electric motor 100. By way of example, but not limitation, in some embodiments the stator assembly 200 includes five stator teeth for three stator coils. In some embodiments, the ratio of electrical frequency to mechanical frequency (i.e. magnetic gear ratio) may be either 14:1 or 16:1. The magnetic gear ratio can be chosen by the choice of magnetic poles on the rotor: such as 32 teeth (poles) for a 16:1 ratio and 28 teeth (poles) for a 14:1 ratio.

Referring to FIGS. 1, 3, 7 and 8, each of the conductor portions (224, 254, 278) of the arms (210, 240, 260) include conduction coils 290 (or windings) which envelop the conductor portions (224, 254, 278) of the arms (210, 240, 260) and through which electrical currents are passed. As current is applied to the conduction coils 290, electrical flux flows to the distal portions (216, 246, 268) and to the plurality of stator teeth (220, 250, 272). The magnetic flux as it is applied to the rotor through the stator teeth, causes to rotate the rotor assembly 300 and the rotatable shaft 310.

Each of the arms (210, 240, 260) having a conduction coil 290 corresponds to an electrical phase of the stator assembly 200 to define a three-phase stator assembly 200. As shown, the distal ends (222, 252, 274, 276) of the arms (210, 240, 260) do not come into contact with one another such that each phase of the three-phase electrical motor 100 is isolated from the other two phases. The distal ends (222, 252, 274, 276) are positioned a distance from the other distal ends and do not form a closed electrical circuit through which current or flux may pass through.

In the illustrated embodiments, the conductor portions (224, 254, 278) of the arms (210, 240, 260) define a conducting region 294 which is non-axisymmetric relative to the longitudinal axis A of the stator opening 292. In some embodiments, it is not necessary to have each of the conductor portions (224, 254, 278) of the arms (210, 240, 260) oriented in a compact area of the motor housing assembly 102 (such as the conducting region 294 shown in FIG. 7). Instead, in some embodiments, at least one of the conductor portions (224, 254, 278) of the arms (210, 240, 260) may be oriented in any location within the motor housing assembly 102. The present disclosure thus enables decoupling and dissociation of the conductor portions (224, 254, 278) of the arms (210, 240, 260) relative to the stator opening 292 by orienting the conduction coils 290 non-axisymmetric relative to the longitudinal axis A of the stator opening 292. As a result, the non-axisymmetric orientation of the conductor portions (224, 254, 278) of the arms (210, 240, 260) enables non-standard electric motors 100 to fit into tight spaces or non-cylindrical envelopes.

Orienting the conduction coils 290 and the conductor portions (224, 254, 278) of the arms (210, 240, 260) in a non-axisymmetric configuration allows for maximizing the envelop and space of the motor housing assembly 102 such that larger conduction coils 290 may be used which generate greater electric loadings without affecting the geometry of the rotor assembly 300. Unlike conventional symmetrical motors, which require proportionally sized axisymmetric rotors and stators, the non-axisymmetric configuration of the electric motor 100 allows for the use of larger conduction coils 290 without having to proportionally increase the size of the rotor assembly 300.

Furthermore, the geometry of each of the conduction coils 290 may be individually varied to balance flux losses between each phase (between the arms (210, 240, 260)), thereby producing higher efficiency. By way of example, the conduction coil 290 of the third arm 260 (also referred to as a central coil) is wound differently than the conduction coils 290 of the first arm 210 and the second arm 240 to maintain the equal resistance values across the three conduction coils 290, given the difference in coil geometry of the conduction coil 290 of the third arm 260 relative to the conduction coils 290 of the first arm 210 and the second arm 240. The size and the number of windings of each conduction coil 290 may also be varied to balance flux losses between each phase. Given the different cross-sectional area and size of each of the conduction coils 290 shown, by winding the same number of turns across all three of the conduction coils 290, the central conduction coil 290 of the third arm 260 will have a longer mean length of copper wire. As a result of this increased copper wire, the resistance and hence the conduction losses will be higher in the central conduction coil 290 of the third arm 260 relative to adjacent conduction coils 290. To balance this, the central conduction coil 290 of the third arm 260 may be larger in size and cross-sectional area in the assembly at the expense of the adjacent conduction coils 290, and therefore lower the resistance and loss in the central conduction coil 290 of the third arm 260.

Figure 10:
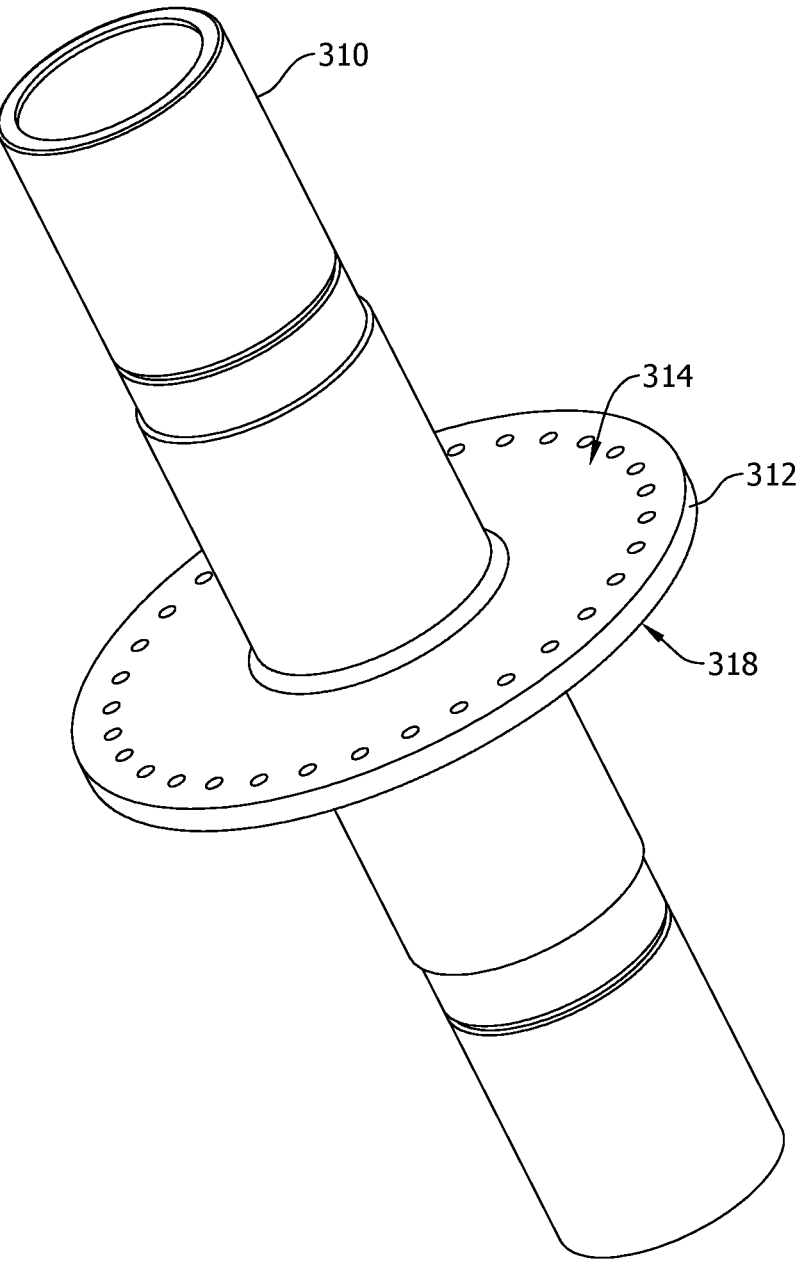
FIG. 10 illustrates a perspective view of a rotatable shaft of the rotor assembly of FIG. 9.
Figure 11:
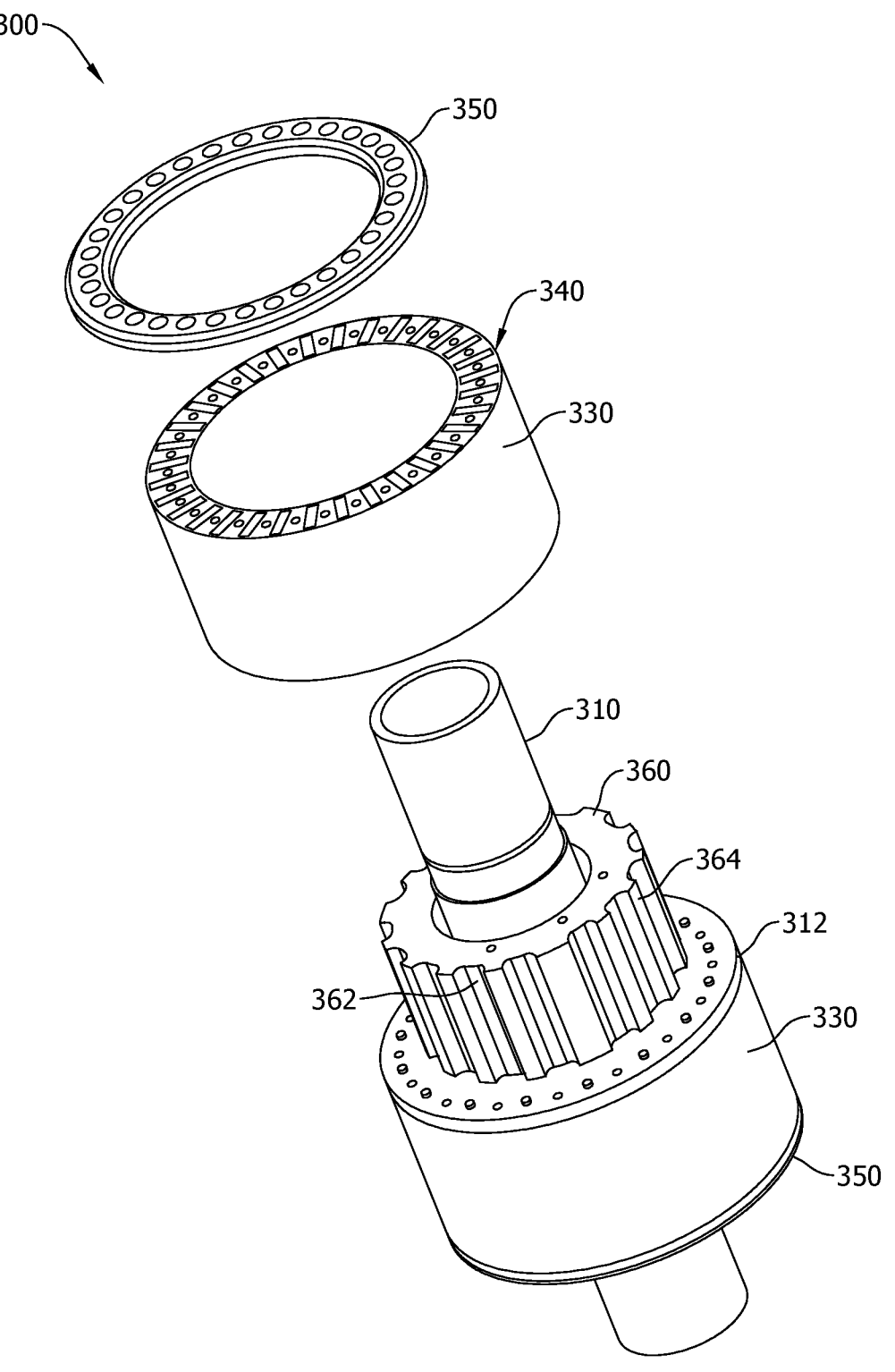
FIG. 11 illustrates a partially exploded view of the rotor assembly of FIG. 9.
Figure 12:
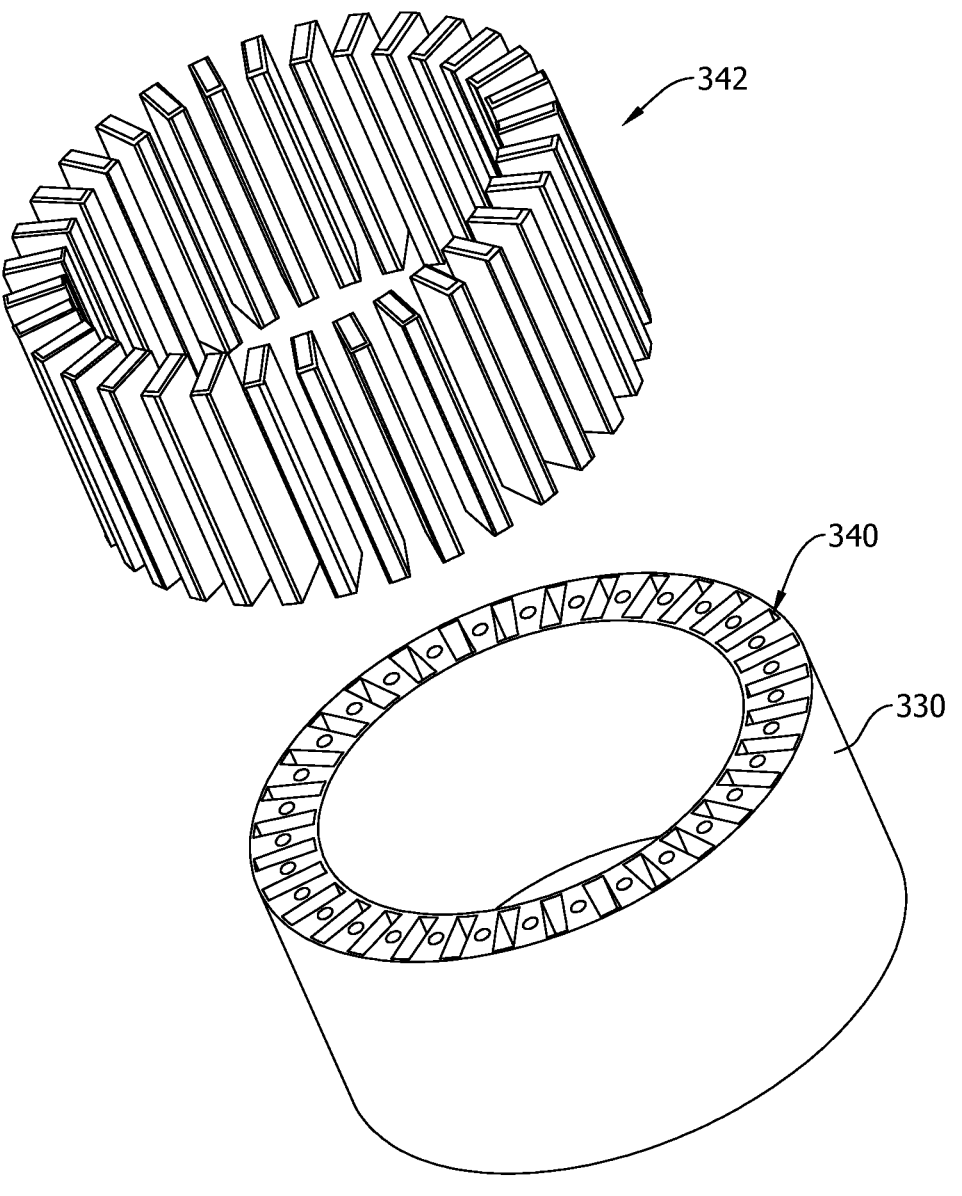
FIG. 12 illustrates an exploded view of a rotor core of the rotor assembly of FIG. 9.

FIG. 9 illustrates a perspective view of the rotor assembly 300. FIG. 10 illustrates a perspective view of the rotatable shaft 310. FIG. 11 illustrates a partially exploded view of the rotor assembly 300. FIG. 12 illustrates an exploded view of a rotor core 300.

Figure 13:
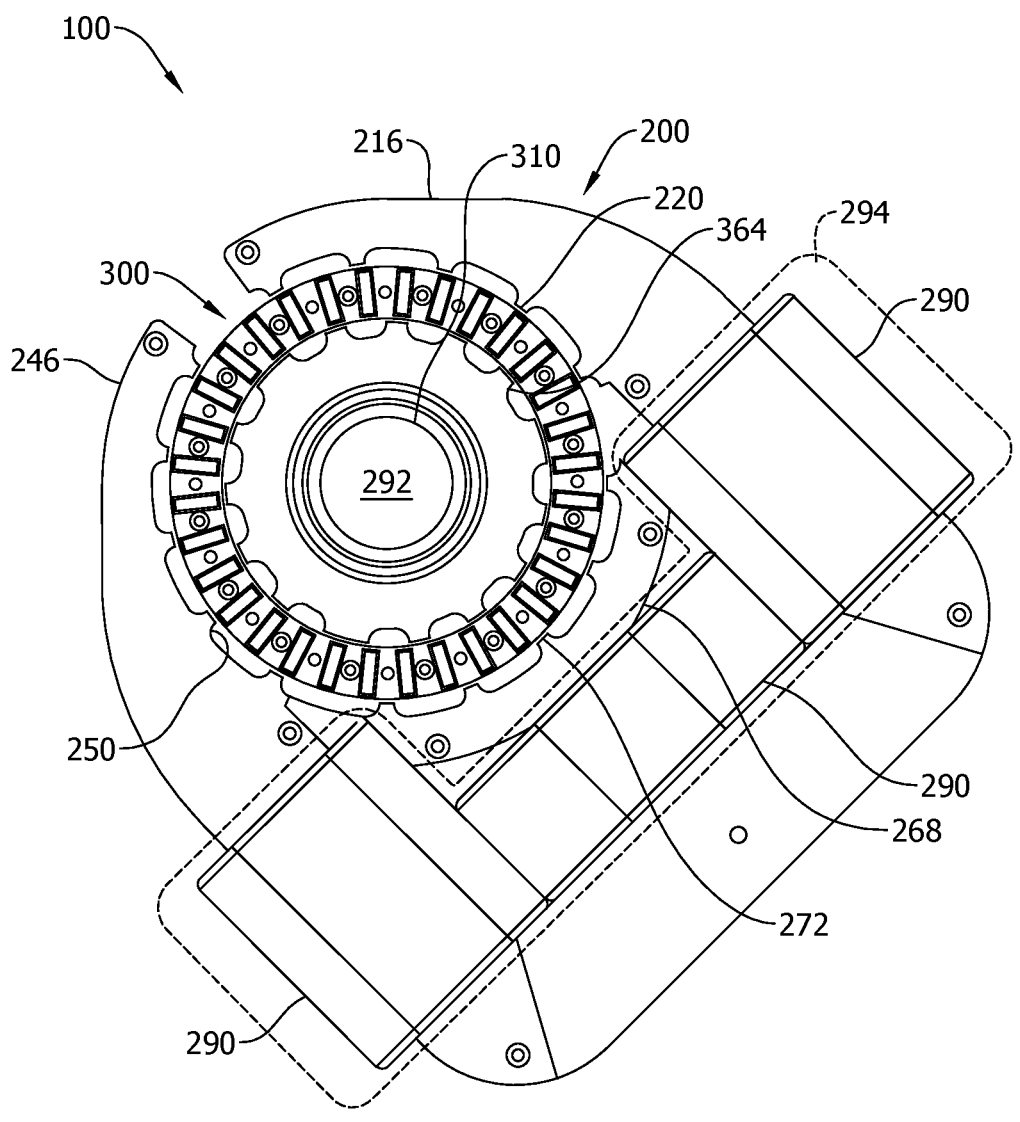
FIG. 13 illustrates a top view of the rotor assembly of FIG. 9 positioned within a stator opening of the stator assembly of FIG. 7; and, FIG. 14 illustrates a schematic view of an alternate exemplary embodiment single-phase non-axisymmetric electric motor.

As shown in FIGS. 9 through 13, the rotor assembly 300 includes the rotatable shaft 310 having the axis of rotation C concentric with the longitudinal axis A of the stator opening 292 (as shown in FIG. 13). The rotatable shaft 310 includes an annular flange 312 defining mating surfaces 314 on opposite ends of the annular flange 312. Coupled to each of the mating surfaces 314 of the flange 312 are rotor cores 330 and rotor hubs 360, with the rotor cores 330 having a hollow cylindrical shape which surrounds the rotor hubs 360. It is understood that the rotatable shaft 310, the rotor cores 330 and rotor hubs 360 are all concentric with the axis of rotation C and the longitudinal axis A of the stator opening 292.

Each rotor hub 360 has a cylindrical body with a central opening that receives shaft 310 therethrough. Each rotor hub 360 has a plurality of rotor teeth 364, formed along the outer periphery of the hub 360. The rotor teeth 364 all have the substantially same profile and pitch (teeth per inch or teeth-per-meter). In some embodiments, each rotor hub 360 is formed by a plurality of stacked laminations that are held together by interlocking, adhesive, welding, bolting, or riveting. The space between adjacent plurality of rotor teeth 364 define a pole of the rotor assembly 300, with the poles of the rotor assembly 300 being equal to the number of the plurality of rotor teeth 364. It is therefore understood that the number of poles of the rotor assembly 300 is used interchangeably with the number of the plurality of rotor teeth 364. In the present disclosure rotor hub 360 includes 15 poles.

Each rotor core 330 has a cylindrical body such that the rotor cores 330 surround the rotor hubs 360. In the exemplary embodiment, the rotor core 330, and the rotor assembly 300 generally, are referred to as a radially embedded permanent magnet rotor assembly. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and variable reluctance motors. Furthermore, in some embodiments, rotor assembly 300 is driven by an electronic control (not shown), for example, a sinusoidal or trapezoidal electronic control.

The rotor core 330 includes a plurality of radially extending slots 340, and each of the plurality of radially extending slots 340 is configured to receive one or more permanent magnets 342 such that each magnet 342 is radially embedded in rotor core 330. In the exemplary embodiment, radially extending slots 340 are generally rectangular. Alternatively, radially extending slots 340 may have any suitable shape corresponding to the shape of the permanent magnets that enables the electric motor to function as described herein. In the exemplary embodiment, permanent magnets 342 are ceramic magnets magnetized in a direction perpendicular to axis of rotation C. However, magnet 342 may be fabricated from any suitable material that enables electric motor 100 to function as described herein, for example, bonded neodymium, AlNiCo, sintered neodymium, bonded and ceramic ferrite, and/or samarium cobalt. In the exemplary embodiments, the rotor assembly 300 further includes end plates 350 affixed to ends of the rotor cores 330 opposite the flange 312 of the rotatable shaft 310. Each end plate 350 is configured to ensure that the magnets 342 are maintained within the radial slots 340 by substantially preventing movement of magnet 342 in a axial direction. In some embodiments, the number of radial slots 340 is equal to the number of the plurality of rotor teeth 364 (and to the number of rotor poles). In some embodiments, magnets 342 are radially oriented between the space of adjacent plurality of rotor teeth 364

FIG. 13 illustrates the rotor assembly 300 positioned within the stator opening 292 of the stator assembly 300 such that the rotor assembly 300 is concentric with the stator opening 292 and the conducting region 294 is non-axisymmetric with respect to the stator opening 292 and the rotor assembly 300.

As previously set forth, in operation, current is applied to the conduction coils 290, and produced electrical flux flows to the distal portions (216, 246, 268) and to the plurality of stator teeth (220, 250, 272) to cause the rotor assembly 300 to rotate about axis C. The electrical flux from the plurality of stator teeth (220, 250, 272) interacts with the plurality of rotor teeth 364 of the rotor assembly 300 to cause rotation of the rotatable shaft 310.

The number of the plurality of stator teeth (220, 250, 272) of the stator assembly 200 and the number of the plurality of rotor teeth 364 of the rotor assembly 300 define a magnetic gear ratio of the electric motor 100. The number of stator teeth and rotor teeth may be varied to increase or decrease a magnetic gear ratio of the electric motor 100 without the need of a mechanical gear box. As previously set forth, in some embodiments, the ratio of electrical frequency to mechanical frequency (i.e. magnetic gear ratio) may be either 14:1 or 16:1. The magnetic gear ratio can be chosen by the choice of magnetic poles on the rotor: such as 32 teeth (poles) for a 16:1 ratio and 28 teeth (poles) for a 14:1 ratio. By way of example, in conveying applications a four-pole motor may be used and driven through a gear reduction (a magnetic gear ratio) of 9:1 to obtain required speeds and torques. The choice of coils, stator teeth, and rotor poles allows the choice of electrical frequency for a given mechanical frequency without coupling the number of rotor poles to stator coils.

Elimination of the gear box also reduces the number of parts which may mechanically fail, such as, but not limited to, oil leakage, clutch wear and gear tooth wear. Furthermore, eliminating the gear box and orienting the conduction coils 290 (and the medial conductor portions (224, 254, 278) generally) in an area previously occupied by a gearbox assembly, enable larger conduction coils 290 to be used which are capable of generating higher torques at low speeds.

Additionally, coils are conventionally wound between stator polls of symmetric motors. The non-axisymmetric configuration of the electric motor 100 also enables the electric motor 100 to generate torque efficiently at very low mechanical speeds by the implementation of the magnetic gear ratio and an internal stationary rotor hub 360, which decouples the number of conduction coils 290 coils from the number of magnet poles of the rotor assembly 300. In particular, the rotor hub 360 includes a radial airgap between the rotor hub 360 and the shaft 310. In some embodiments, the rotor hub 360 is fastened to the cylindrical flange 146 of the housing, thereby locking the rotor hub 360 in a stationary position with the housing.

Figure 14:
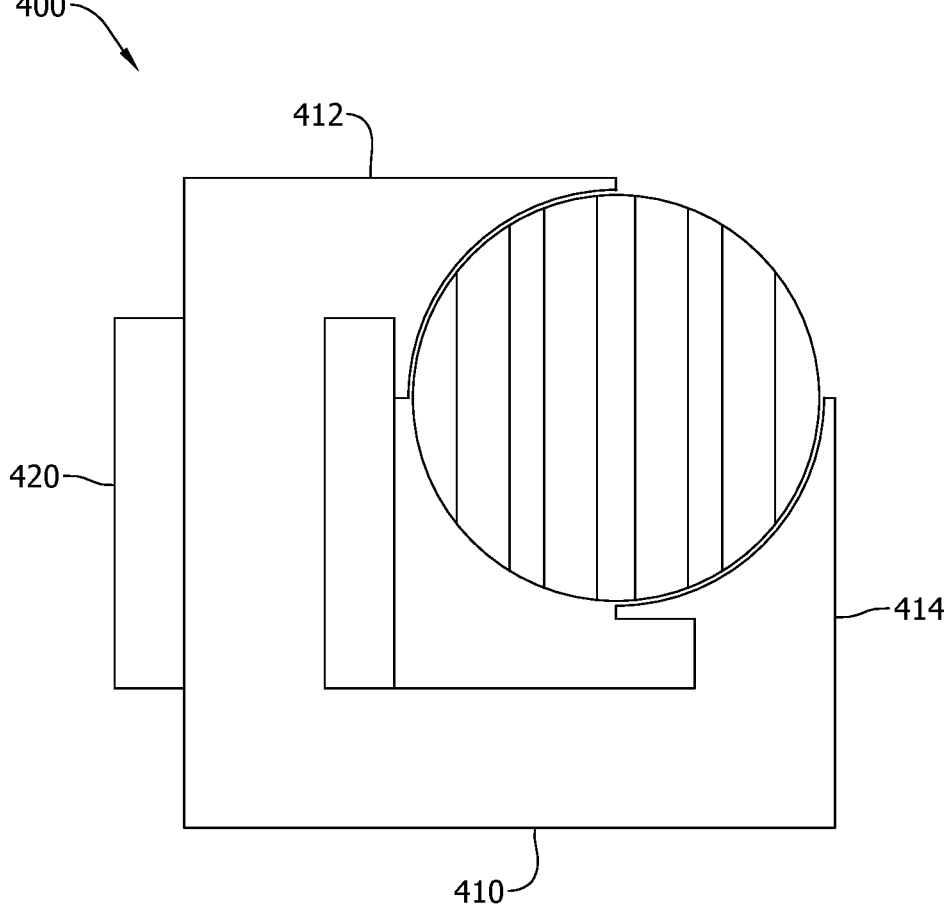

FIG. 14 illustrates a schematic view of an exemplary single-phase non-axisymmetric electric motor 400. The single phase non-axisymmetric electric motor 440 includes a stator 410 having two arms (412, 414). In the illustrated embodiment, only one of the two arms (412, 414) includes a conduction coil 420 which corresponds to a single-phase motor. In some embodiments, both of the arms (412, 414) include a conduction coil 420 which corresponds to a dual-phase motor.

Exemplary embodiments of stator assemblies for electric machines are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor assembly for an electric motor assembly comprising:

a stator assembly including:

a first stator arm and a second stator arm, each of the first stator arm and the second stator arm including:

a distal portion having an inner surface and a plurality of stator teeth spaced along the inner surface of each of the first stator arm and the second stator arm, and a conductor portion located proximate to the distal portion; and a third stator arm positioned between the first stator arm and the second stator arm, the third stator arm including:

a mating portion, a conductor portion extending from the mating portion, and a distal portion extending laterally from the conductor portion, opposite the mating portion, wherein the distal portions of the first stator arm, the second stator arm and the third stator arm collectively define a stator opening, the opening having an axis, and wherein the conductor portion of each of the first stator arm and the second stator arm is non-axisymmetric relative to the axis of the opening; and a rotor assembly located in the opening proximate the stator teeth.

2. The motor assembly of claim 1 further comprising a conduction coil enveloping the conductor portion of each of the first stator arm and the second stator arm.

3. The motor assembly of claim 2, wherein the conduction coil of each of the first stator arm and the second stator arm are arranged non-axisymmetrically around the rotor assembly.

4. The motor assembly of claim 2, wherein each of the first stator arm and the second stator arm corresponds to a pole.

5. The motor assembly of claim 4, wherein application of an electrical current to the conduction coil causes magnetic flux to flow from the conductor portion to the distal portion of each of the first stator arm and the second stator arm.

6. The motor assembly of claim 1, wherein the each of the distal portions has an arc-shape.

7. The motor assembly of claim 1, wherein the distal portion of the first stator arm is positioned a distance from the distal portion of the second stator arm.

8. The motor assembly of claim 1, wherein the rotor assembly comprises:

a rotatable rotor shaft including a flange defining a mating surface, a rotor core affixed to the mating surface of the rotor shaft, the rotor core having a hollow cylindrical shape defining an opening and an axis of rotation, the rotor core including a plurality of rotor poles circumferentially located about the axis of rotation, each pair of adjacent poles being separated by a space, a plurality of core magnets located in the spaces separating the adjacent poles, and, a rotor hub affixed to the mating surface and positioned within the opening of the rotor core, the rotor hub including an outside surface having a plurality of rotor teeth.

9. The motor assembly of claim 8, wherein the rotor assembly further comprises a retainer plate affixed to the rotor core.

10. The motor assembly of claim 8, wherein the rotor assembly further comprises a second rotor core affixed to an opposite mating surface of the rotor shaft.

11. The motor assembly of claim 8, wherein the rotor teeth and stator teeth define a magnetic gear ratio.

12. A stator assembly comprising:

a first stator arm and the second stator arm, each of the first stator arm and the second stator arm including:

a distal portion having an inner surface and a plurality of stator teeth spaced along the inner surface of each of the first stator arm and the second stator arm, and a conductor portion located proximate to the distal portion; and, a third stator arm positioned between the first stator arm and the second stator arm, the third stator arm including:

a mating portion, a conductor portion extending from the mating portion, and a distal portion extending laterally from the conductor portion, opposite the mating portion, wherein the distal portions of the first stator arm, the second stator arm and the third stator arm collectively define a stator opening, the opening having an axis, and wherein the conductor portion of each of the first stator arm and the second stator arm is non-axisymmetric relative to the axis of the opening.

13. The stator assembly of claim 12, wherein each of the first stator arm and the second stator arm further comprises a mating portion proximate to the conductor portion, each mating portion having a mating surface.

14. The stator assembly of claim 13, wherein the mating surface of the first stator arm abuts the mating surface of the second stator arm.

15. The stator assembly of claim 12, wherein the conduction portion is configured to support a conduction coil.

16. The stator assembly of claim 12, wherein the conductor portion of the third stator arm extends perpendicular to the mating portion of the third stator arm.

17. The stator assembly of claim 16, wherein the conductor portion of the third stator arm is perpendicular to the distal portion of the third stator arm.

18. The stator assembly of claim 17, wherein the mating portion, conductor portion and distal portion of the third stator arm define an H shape.

19. The stator assembly of claim 12, wherein the first stator arm, the second stator arm and the third stator arm form a unitary body.

\*    \*    \*    \*    \*